United States Patent [19]

Chang et al.

[11] Patent Number: 5,104,495
[45] Date of Patent: Apr. 14, 1992

[54] CRYSTALLINE (METALLO) ALUMINOPHOSPHATE COMPOSITION MCM-40, ITS SYNTHESIS AND USAGE IN HYDROCARBON CONVERSION

[75] Inventors: Clarence D. Chang, Princeton; John D. Lutner, Hamilton Square; John L. Schlenker, Pennington, all of N.J.

[73] Assignee: Mobil Oil Corp., Fairfax, Va.

[21] Appl. No.: 625,403

[22] Filed: Dec. 11, 1990

[51] Int. Cl.⁵ .................. C10G 45/00; C01B 25/36
[52] U.S. Cl. ................. 208/46; 208/135; 208/137; 208/108; 585/502; 585/509; 585/733; 423/305; 423/306; 423/277
[58] Field of Search ........... 423/305, 306, 328, 329, 423/277; 502/208, 214; 208/46, 135–137, 108; 585/502, 509, 733

[56] References Cited

U.S. PATENT DOCUMENTS

| | | | |
|---|---|---|---|
| 4,440,871 | 4/1984 | Lok et al. | 502/214 |
| 4,673,559 | 6/1987 | Derouane et al. | 423/306 |
| 4,778,780 | 10/1988 | Valyocsik et al. | 423/305 |
| 4,853,197 | 8/1989 | Wilson et al. | 423/306 |
| 4,880,611 | 11/1989 | von Ballmoos et al. | 423/306 |
| 4,935,216 | 6/1990 | Lok et al. | 423/328 |

FOREIGN PATENT DOCUMENTS 8901912 3/1989 European Pat. Off. .

OTHER PUBLICATIONS

Lok et al., "The Role of Organic Molecules in Molecular Sieve Synthesis," *Zeolites*, vol. 3, Oct. 1983, pp. 282–291.

*Primary Examiner*—R. Bruce Breneman
*Attorney, Agent, or Firm*—Alexander J. McKillop; Charles J. Speciale; Laurence P. Hobbes

[57] ABSTRACT

This invention relates to a new crystalline composition MCM-40, to a method for synthesizing said crystalline composition using diaminocyclohexane as a directing agent and to use of said crystalline composition as a catalyst component for organic compound, e.g. hydrocarbon compound, conversion.

19 Claims, 3 Drawing Sheets

FIG. 1  XRAY DIFFRACTION PATTERNS

FIG. 2  XRAY DIFFRACTION PATTERNS

FIG. 3 XRAY DIFFRACTION PATTERNS

CRYSTALLINE (METALLO) ALUMINOPHOSPHATE COMPOSITION MCM-40, ITS SYNTHESIS AND USAGE IN HYDROCARBON CONVERSION

BACKGROUND OF THE INVENTION

1. Field of the Invention

This invention relates to a novel synthetic crystalline [metallo]aluminophosphate composition, MCM-40 which can be prepared from a reaction mixture containing a diaminocyclohexane directing agent, e.g., trans-1,4-diaminocyclohexane, and sources of +3 valence element X, e.g. aluminum, +5 valence element Y, e.g. phosphorus and, optionally a non-aluminum, non-phosphorus element M, a method for preparing the new crystalline composition and its use as a catalyst component for organic compound, e.g. hydrocarbon compound, conversion.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity. U.S. Pat. No. 4,673,559 teaches numerous different silicoaluminophosphate structures. Examples 17 and 18 of that patent show synthesis of MCM-9, a silicoaluminophosphate composition containing crystals having large pore windows measuring between 12 and 13 Angstroms in diameter.

An early reference to a hydrated aluminum phosphate which is crystalline is the "$H_1$" phase or hydrate of aluminum phosphate of F. d'Yvoire, *Memoir Presented to the Chemical Society*. No. 392, "Study of Aluminum Phosphate and Trivalent Iron", July 6, 1961 (received), pp. 1762-1776. This material, when crystalline, is identified by the Joint Commission for Powder Diffraction Standards (JCPDS), card number 15-274, and has an X-ray diffraction pattern exhibiting lines of Tables I and II, hereinafter presented. Once heated at about 110° C., however, the d'Yvoire material becomes amorphous or transforms to the aluminophosphate form of tridymite. The 18-membered ring aluminophosphate VPI-5 was published by M. Davis et al. at the "Innovation in Zeolite Materials Science" meeting in September, 1987. A further description of this material and its metal substituted aluminumphosphate counterparts can be found in published PCT application WO 89/01912, International Application Number PCT/US 88/02910 to Davis et al, filed 24 Aug. 1988 and published 9 Mar. 1989. U.S. Pat. No. 4,673,559 discloses the 18-membered ring silicoaluminophosphate MCM-9.

Silicoaluminophosphates of various structures are taught in U.S. Pat. No. 4,440,871. Aluminosilicates containing phosphorous, i.e. silico[metallo]aluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,639,357 (MCM-5) and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al., 3 Zeolites, 282-291, (1983), teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of the presently required directing agent compound for synthesis of the [metallo]aluminophosphate compositions of this invention.

U.S. Pat. No. 4,853,197 to Wilson et al, incorporated herein by reference, discloses metal aluminosphosphate materials having an X-ray diffraction pattern (set out in Table 50S therein) related to the compositions of the present invention. Such materials are known as MeAPO-50 wherein Me is selected from cobalt, manganese, magnesium and zinc.

SUMMARY OF THE INVENTION

The composition of the present invention is prepared by forming a reaction mixture hydrogel containing sources of +3 valence element X, e.g. aluminum, +5 valence element Y, e.g. phosphorus, directing agent DA, water, and optionally, non-aluminum, non-phosphorus element M, hereinafter more particularly described, and having a composition, in terms of mole ratios, within the following ranges:

|  | Broad | Preferred | Most Preferred |
| --- | --- | --- | --- |
| M/Al$_2$O$_3$ | 0 to 1.2 | 0 to 0.6 | 0 to 0.4 |
| P$_2$O$_5$/Al$_2$O$_3$ | 1 to 1.6 | 1 to 1.4 | 1 to 1.25 |
| H$_2$O/Al$_2$O$_3$ | 10 to 100 | 20 to 80 | 40 to 60 |
| DA/Al$_2$O$_3$ | 0.2 to 1.2 | 0.3 to 1 | 0.4 to 0.6 | where DA is a diaminocyclohexane directing agent, preferably 1,4-diaminocyclohexane, e.g. cis-1,4-diaminocyclohexane or more preferably trans-1,4-diaminocyclohexane, and maintaining the mixture under sufficient conditions until crystals of the desired crystalline composition are formed.

Reaction conditions required of the instant invention comprise heating the foregoing reaction mixture to a temperature of 90° C. to 150° C., for 0.5 hour to 100 hours. A more preferred temperature range is from 130° C. to 150° C. with the amount of time at a temperature in such range being from 15 hours to 25 hours. The solid product comprising the desired MCM-40 composition is recovered from the reaction medium, e.g., by cooling the whole reaction medium to room temperature, filtering and water washing.

EMBODIMENTS

The crystalline composition synthesized in accordance with the present method exhibits utility as a catalyst component for certain chemical reactions of interest, including cracking, hydrocracking, disproportionation, alkylation, isomerization and oxidation.

The particular effectiveness of the presently required directing agent, when compared with other directing agents, such as those identified above, is believed due to its ability to function as a template in the above reaction mixture in the nucleation and growth of the desired MCM-40 crystals with the limitations above discussed.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline MCM-40 hereby can be prepared utilizing materials which can supply the appropriate oxide. The useful sources of +3 valence element X include, as non-limiting examples, any known form of +3 valence element oxide or hydroxide, organic or inorganic salt or compound, e.g. alumina and aluminates. Preferably, X is selected from the group consisting of B, Al, Ga, and In. Sources of aluminum oxide include pseudo-boehmite and aluminum tetraalkoxide.

The +5 valence element Y can be selected from the group consisting of P, As, Sb, Bi, V, and Nb with P, especially preferred. Useful sources of +5 valence element Y include, as non-limiting examples, any known form of +5 valence element acids or oxides, e.g. phosphates and phosphites, and organic derivatives of +5 valence elements. Ortho-phosphoric acid is particularly preferred. The useful sources of element M include, as non-limiting examples, any known form of element, e.g. metal, its oxide or hydride or salt, alkoxy or other organic compound containing M.

M is one or more elements selected from the group consisting of elements having a valence of +2, +4 or +6. Preferred embodiments of M include Be, Mg, Ca, Sr, Ba, Ti, Zr, Hf, V, Cr, Mo, W, Mn, Re, Fe, Ru, Os, Co, Rh, Ir, Ni, Pd, Pt, Cu, Zn, Cd, Hg, C, Si, Ge, Sn, Pb, S, Se, Te, and Po, with silicon and cobalt particularly preferred. Exemplary sources of M include, cobalt acetate and colloidal silica.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired MCM-40 will vary with the exact nature of the reaction mixture employed within the above-described limitations. In a preferred embodiment, sources of +3 valence element and +5 valence element, e.g. sources of aluminum and phosphorus are combined and exposed to elevated temperatures (60°-80° C.) for 1.5 to 4 hours before addition of the directing agent and optional source of M. The resulting mixture is thereafter heated at the same temperature for an additional 0.2 to 2 hours, e.g., 0.5 hour. Optionally, the resulting gel can be treated under pressure in a nitrogen atmosphere for an additional period of time.

The MCM-40 composition synthesized hereby can be characterized by a composition in which the number of atoms of +3 valence element X and +5 valence element Y is greater than the number of atoms of M, i.e. X+Y>M. The characteristic composition of this material, in the anhydrous state and as synthesized, is as follows:

wherein v is the number of moles of DA, occluded organic material resulting from organic directing agent used in synthesis of and filling microporous voids of the crystalline composition, which material may be removed upon calcination, and M is one or more elements of valence m (weighted average) wherein m is selected from the group consisting of +2, +4 and +6 and x and y are numbers which satisfy the relationship:

$$z = y - x + (4 + m)(x + y)$$

wherein z is a number of from greater than −1 to less than +1. When z is greater than 0, the composition will mostly behave as a cation exchanger with potential use as an acidic catalyst. When z is less than 0, the composition will mostly behave as an anion exchanger with potential use as a basic catalyst. In a preferred embodiment, X=Al, Y=P and x +y=0, i.e., the material is an aluminophosphate.

The composition of the composition following removal of the organic component, for example by calcination, is the following:

where all symbols and letters have their aforementioned meanings. The material synthesized hereby can exhibit an ion-exchange capacity of at least about 0.002 meq/g.

As synthesized, in general, the crystalline composition comprises structural aluminum, phosphorus and element M, and will exhibit an M/(aluminum plus phosphorus) atomic ratio of less than unity and usually within the range of from about 0.001 to about 0.99. The phosphorus/aluminum atomic ratio of such materials may be found to vary from about 0.01 to about 100.0, as synthesized. It is well recognized that aluminum phosphates exhibit a phosphorus/aluminum atomic ratio of about unity, and essentially no element M.

The crystalline composition resulting from the present method comprises crystals having a crystal structure which exhibits, even after being heated at 110° C or higher, a characteristic X-ray diffraction pattern having the following characteristic values:

TABLE 1A

| Interplanar d-Spacings (Angstroms) | Relative Intensity* |
|---|---|
| 11.20 ± 0.09 | s–vs |
| 9.14 ± 0.08 | vw–vs |
| 5.28 ± 0.05 | vw–w |
| 4.78 ± 0.04 | vw–s |
| 4.43 ± 0.04 | vw–vs |
| 3.84 ± 0.03 | vw–vs |

*SCALE: vw (very weak) = 0–20; w (weak) = 20–40; m (medium) = 40–60; s (strong) = 60–80; vs (very strong) = 80–100.

where these particular d-values are chosen so as to uniquely define a unit cell.

More specifically, the composition of the present invention can exhibit the following characteristic values:

TABLE 1B

| d ± Δd A | Intensity Range* |
|---|---|
| 11.20 ± 0.09 | s–vs |

TABLE 1B-continued

| d ± Δd A | Intensity Range* |
|---|---|
| 9.14 ± 0.08 | vw–vs |
| 7.08 ± 0.06 | vw–m |
| 5.28 ± 0.05 | vw–w |
| 4.78 ± 0.04 | vw–s |
| 4.57 ± 0.04 | vw–m |
| 4.43 ± 0.04 | vw–vs |
| 4.23 ± 0.04 | vw–m |
| 4.12 ± 0.03 | vw–w |
| 3.84 ± 0.03 | vw–vs |
| 3.73 ± 0.03 | vw–w |
| 3.54 ± 0.03 | vw–m |
| 3.46 ± 0.03 | vw–w |
| 3.11 ± 0.03 | vw–m |
| 3.06 ± 0.03 | vw–w |
| 2.80 ± 0.02 | vw–w |
| 2.77 ± 0.02 | vw–w | and even more specifically, the characteristic values of Table 1C below:

TABLE 1C

| 2Θ | d-value | Relative Intensity |
|---|---|---|
| 7.908 | 11.180 | 85.9 |
| 9.698 | 9.120 | 49.9 |
| 12.514 | 7.073 | 35.8 |
| 13.686 | 6.470 | 3.5 |
| 14.518 | 6.101 | 7.4 |
| 15.814 | 5.604 | 1.3 |
| 16.783 | 5.282 | 13.4 |
| 18.577 | 4.776 | 63.0 |
| 19.441 | 4.566 | 32.4 |
| 20.022 | 4.435 | 100.0 |
| 20.989 | 4.232 | 46.3 |
| 21.542 | 4.125 | 20.7 |
| 23.147 | 3.842 | 96.6 |
| 23.840 | 3.732 | 19.6 |
| 25.162 | 3.539 | 35.0 |
| 25.632 | 3.475 | 32.3 |
| 27.568 | 3.236 | 4.2 |
| 28.020 | 3.184 | 3.1 |
| 28.748 | 3.105 | 40.0 |
| 29.166 | 3.062 | 13.2 |
| 29.320 | 3.046 | 19.1 |
| — | — | —* |
| 30.943 | 2.8898 | 8.5 |
| 31.966 | 2.7997 | 19.4 |
| 32.376 | 2.7651 | 28.1 |
| 33.470 | 2.6772 | 2.2 |
| 33.967 | 2.6392 | 3.5 |

*Peak present but intensity too weak to permit accurate measurement.

The X-ray diffraction lines in Tables 1A, 1B and 1C identify a new crystalline material. These lines distinguish this crystalline material from other known crystalline [metallo]aluminophosphate structures. These X-ray diffraction data were collected with a conventional X-ray system, using copper K-alpha radiation. The positions of the peaks, expressed in degrees 2-theta, where 2-theta is the Bragg angle, were determined by scanning 2-theta. The interplanar spacings, d, measured in Angstrom units, and the relative intensities of the lines, 100 × I/I₀, where I₀ is the intensity of the strongest line, including subtraction of the background, were derived by analysis of the primary data. The relative intensities are given in terms of the symbols vs=very strong (75–100%), s=strong (50–74%), m=medium (25–49%) and w=weak (0–24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated. such as by dilute acid treatment. Other variations can occur, depending on the +4 valence element/+3 valence element, e.g. silicon/aluminum, and the +5 valence element/+3 valence element, e.g. phosphorus-/aluminum, ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

While the improved crystalline composition of the present invention may be used as a catalyst component in a wide variety of organic compound, e.g. hydrocarbon compound conversion reactions, it is notably useful in the processes of cracking, hydrocracking, isomerization and reforming. Other conversion processes for which the present composition may be utilized as a catalyst component include, for example, dewaxing.

The crystalline composition MCM-40 prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

The present composition, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 200° C. to about 550° C. for from 1 hour to about 48 hours.

As above mentioned, the crystalline molecular sieve composition MCM-40 prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, IB, IIB, IIIB, IVB, VIB AND VIII of the Periodic Table of Elements, especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the molecular sieve composition is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared composition with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjunction with the present composition, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized composition include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 hr$^{-1}$, preferably between 1 and 4 hr$^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 hr$^{-1}$, preferably between 0.5 and 4 hr$^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the composition of this invention can also be used for reducing the pour point of gas oils. This process is carried out at a liquid hourly space velocity between about 0.1 and about 5 hr$^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following Examples are presented.

EXAMPLE 1

34.0 g of Kaiser alumina (pseudo-boehmite, 75% Al$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 28.55 g trans-1,4-diaminocyclohexane was added. This final mixture was heated for an additional 30 minutes at 70° C. Product was cooled to room temperature, washed with distilled H$_2$O, filtered and dried under vacuum at 60° C. for 18 hours.

EXAMPLE 2

34.0 g of Kaiser alumina (pseudo-boehmite, 75% Al$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 28.55 g trans-1,4-diaminocyclohexane was added. This final mixture was heated for an additional 30 minutes at 70° C. The resulting gel was placed into a 300 cc autoclave equipped with a stainless steel liner, sealed, pressurized to 300 psig with nitrogen and heated without stirring to 135° C. for 15 hours. After allowing to cool, pressure was released and the product was removed and slurried/decanted using distilled H$_2$O until a reasonably clear liquid was obtained. Solid product was then filtered/washed with additional distilled H$_2$O followed by drying in air at 130° C.

EXAMPLE 3

34.0 g of Kaiser alumina (pseudo-boehmite, 75% Al$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 12.85 g trans-1,4 diaminocyclohexane was added. This final mixture was heated for an additional 30 minutes at 70° C. The product was slurried/decanted using distilled H$_2$O until a reasonably clear liquid was obtained. Solid product was then filtered/washed with additional distilled H$_2$O followed by drying in air at 130° C.

EXAMPLE 4

34.0 g of Kaiser alumina (pseudo-boehmite, 75% Al$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 12.85 g trans-1,4 diaminocyclohexane was added. This final mixture was heated for an additional 30 minutes at 70° C. The resulting gel was placed into a 300 cc autoclave equipped with a stainless steel liner, sealed, pressurized to 300 psig with nitrogen and heated without stirring to 135° C. for 17 hours. After allowing to cool, pressure was released and the product was removed and slurried/decanted using distilled H$_2$O until a reasonably clear liquid was obtained. Solid product was then filtered/washed with additional distilled H$_2$O followed by drying in air at 130° C.

EXAMPLE 5

34.0 g of Kaiser alumina (pseudo-boehmite, 75% AL$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 11.42 g trans-1,4 diaminocyclohexane was added. This final mixture was heated for an additional 30 minutes at 70° C. The resulting gel was placed into a 300 cc autoclave equipped with a stainless steel liner, sealed, pressurized to 300 psig with nitrogen and heated without stirring to 128° C. for 90 hours. After allowing to cool, pressure was released and the product was removed and slurried/decanted using distilled H$_2$O until a reasonably clear liquid was obtained. Solid product was then filtered/washed with additional distilled H$_2$O followed by drying in air at 130° C.

EXAMPLE 6

34.0 g of Kaiser alumina (pseudo-boehmite, 75% Al$_2$O$_3$) were added to a mixture of 77.5 g distilled H$_2$O and 57.2 g 85.7% ortho-phosphoric acid (H$_3$PO$_4$). The solution was heated with stirring at 70° C. for 2.5 hours. To this, a mixture of 75.0 g distilled H$_2$O and 11.42 g trans-1,4 diaminocyclohexane was added. This final mixture was heated for an additional 30 minutes at 70° C. The resulting gel was left at 25° C. for 90 hours. Product was removed and slurried/decanted using distilled H₂O until a reasonably clear liquid was obtained. Solid product was then filtered/washed with additional distilled H₂O followed by drying in air at 130° C.

EXAMPLE 7

27.2 g of Kaiser alumina (pseudo-boehmite, 75% Al₂O₃) were added to a mixture of 77.5 g distilled H₂O and 57.2 g 85.7% ortho-phosphoric acid (H₃PO₄). The solution was heated with stirring at 70° C. for 4 hours. To this, a mixture of 75.0 g distilled H₂O, 28.55 g trans-1,4 diaminocyclohexane and 6.0 g SiO₂ (Cab-O-sil ™) was added. This final mixture was heated for an additional 30 minutes at 70° C. The resulting gel was placed into a 300 cc autoclave equipped with a stainless steel liner, sealed, pressurized to 300 psig with nitrogen and heated without stirring to 145° C. for 15 hours. After allowing to cool, pressure was released and the product was removed and slurried/decanted using distilled H₂O until a reasonably clear liquid was obtained. Solid product was then filtered/washed with additional distilled H₂O followed by drying in air at 130° C.

EXAMPLE 8

The product from Example 7 was washed with distilled H₂O using a Soxhlet apparatus. Washed product was filtered and dried at 130° C. in air for 3 hours.

EXAMPLE 9

20.4 g of Kaiser alumina (pseudo-boehmite, 75% Al₂O₃) were added to a mixture of 77.5 g distilled H₂O and 57.2 g 85.7% ortho-phosphoric acid (H₃PO₄). The solution was heated with stirring at 70° C. for 2 hours. To this, a mixture of 75.0 g distilled H₂O, 28.55 g trans-1,4 diaminocyclohexane and 49.82 g cobalt acetate were added. This final mixture was heated for an additional 30 minutes at 70° C. The resulting gel was placed into a 300 cc autoclave equipped with a stainless steel liner, sealed, pressurized to 300 psig with nitrogen and heated without stirring to 140° C. for 20 hours. After allowing to cool, pressure was released and the product was removed and slurried/decanted using distilled H₂O until a reasonably clear liquid was obtained. Solid product was then filtered/washed with additional distilled H₂O followed by drying in air at 130° C.

EXAMPLE 10

20.4 g of Kaiser alumina (pseudo-boehmite, 75% Al₂O₃) were added to a mixture of 77.5 g distilled H₂O and 57.2 g 85.7% ortho-phosphoric acid (H₃PO₄). The solution was heated with stirring at 70° C. for 2 hours. To this, a mixture of 75.0 g distilled H₂O, 28.55 g trans-1,4 diaminocyclohexane and 49.82 g cobalt acetate was added. This final mixture was heated for an additional 30 minutes at 70° C. The resulting gel was heated to 100° C. for 21 hours in a steam chest. After allowing to cool, product was removed and slurried/decanted using distilled H₂O until a reasonably clear liquid was obtained. Solid product was then filtered/washed with additional distilled H₂O followed by drying in air at 130° C.

EXAMPLE 11

The product from Example 4 was washed with distilled H₂O using a Soxhlet apparatus. Washed product was filtered and dried at 130° C. in air for 3 hours.

EXAMPLE 12

The product from Example 11 was calcined in helium at a rate of 0.5° C./min from room temperature to 400° C. and held for 0.5 hour.

EXAMPLE 13

The product from Example 9 was calcined in air at a rate of 1° C./min from room temperature to 300° C. and held for 4 hours.

EXAMPLE 14

The product from Example 8 was calcined in air at a rate of 1° C./min from room temperature to 300° C. and held for 4 hours.

EXAMPLE 15

The product from Example 11 was vacuum calcined at 400° C. for 0.5 hour.

EXAMPLE 16

The product from Example 4 was calcined at 200° C. for 6 hours.

EXAMPLE 17

The product from Example 5 was washed with distilled H₂O using a Soxhlet apparatus. Washed product was filtered and dried at 130° C. in air for 3 hours.

EXAMPLE 18

The product from Example 17 was calcined at 200° C. for 18 hours.

Characteristics of the products of the Examples are set out in the following Tables and Figures.

Table 2 contains elemental analysis and sorption data for Examples 7 through 12.

Table 3 contains calculated d-values and relative intensities for the product from Example 1.

Table 4 contains calculated d-values and relative intensities for the product from Example 2.

Table 5 contains calculated d-values and relative intensities for the product from Example 16.

Table 6 contains calculated d-values and relative intensities for the product from Example 18.

TABLE 2

MCM-40 SORPTION DATA AND ELEMENTAL ANALYSIS

| EXAMPLE # | SORPTION* WT % BENZENE | ELEMENTAL ANALYSIS | | | | |
|---|---|---|---|---|---|---|
| | | % Si | % Al | % P | % C | % N |
| 7 | <3 | | | | | |
| 8 | <2 | 2.65 | 10.73 | 15.04 | 15.74 | 6.21 |
| 9 | <1 | | | | | |
| 11 | <3 | — | 15.29 | 18.71 | 11.62 | 4.54 |
| 12 | 19.6 | | | | | |

*(Room Temp, P/Po = 0.5)

TABLE 3

Calculation of d-values and Relative Intensities
MCM-40 Preparation of Example 1
Wavelength for this run: 1.54178 A

| INDEX | 2θ | d-VALUE | RELATIVE INTENSITY |
|---|---|---|---|
| 100 | 7.912 | 11.174 | 86.3 |
| 002 | 9.730 | 9.090 | 73.7 |
| 102 | 12.526 | 7.066 | 34.2 |
| 110 | 13.700 | 6.463 | 4.0 |
| 111/003 | 14.535 | 6.094 | 6.4 |
| 200 | 15.845 | 5.593 | 2.6 |
| 112 | 16.803 | 5.276 | 10.9 |
| 202 | 18.600 | 4.770 | 57.8 |
| 004 | 19.454 | 4.563 | 25.4 |
| 113 | 20.045 | 4.430 | 100.0 |
| 210/104 | 21.017 | 4.226 | 40.2 |
| 211/203 | 21.583 | 4.117 | 20.4 |
| 212 | 23.189 | 3.836 | 88.7 |
| 300/114 | 23.875 | 3.727 | 21.4 |
| 204 | 25.189 | 3.535 | 34.0 |
| 213/105 | 25.670 | 3.470 | 28.0 |
| 220 | 27.642 | 3.227 | 4.0 |
| 211/303/115 | — | — | —* |
| 310/214 | 28.792 | 3.101 | 33.3 |
| 311/205 | 29.226 | 3.056 | 13.3 |
| 222/006 | 29.346 | 3.042 | 16.6 |
| 312/106 | 30.472 | 2.9334 | 2.0 |
| 304 | 30.968 | 2.8876 | 6.8 |
| 400 | 32.021 | 2.7950 | 15.5 |
| 401/313/215 | 32.412 | 2.7621 | 25.5 |
| 402/206 | 33.504 | 2.6746 | 1.9 |
| 224 | 34.009 | 2.6360 | 3.3 |

*Peak present but intensity too weak to permit accurate measurement.

TABLE 4

Calculation of d-values and Relative Intensities
MCM-40 Preparation of Example 2
Wavelength for this run: 1.54178 A

| INDEX | 2θ | d-VALUE | RELATIVE INTENSITY |
|---|---|---|---|
| 100 | 7.908 | 11.180 | 85.9 |
| 002 | 9.698 | 9.120 | 49.9 |
| 102 | 12.514 | 7.073 | 35.8 |
| 110 | 13.686 | 6.470 | 3.5 |
| 111/003 | 14.518 | 6.101 | 7.4 |
| 200 | 15.814 | 5.604 | 1.3 |
| 112 | 16.783 | 5.282 | 13.4 |
| 202 | 18.577 | 4.776 | 63.0 |
| 004 | 19.441 | 4.566 | 32.4 |
| 113 | 20.022 | 4.435 | 100.0 |
| 210/104 | 20.989 | 4.232 | 46.3 |
| 211/203 | 21.542 | 4.125 | 20.7 |
| 212 | 23.147 | 3.842 | 96.6 |
| 300/114 | 23.840 | 3.732 | 19.6 |
| 204 | 25.162 | 3.539 | 35.0 |
| 213/105 | 25.632 | 3.475 | 32.3 |
| 220 | 27.568 | 3.236 | 4.2 |
| 211/303/115 | 28.020 | 3.184 | 3.1 |
| 310/214 | 28.748 | 3.105 | 40.0 |
| 311/205 | 29.166 | 3.062 | 13.2 |
| 222.006 | 29.320 | 3.046 | 19.1 |
| 312/106 | — | — | —* |
| 304 | 30.943 | 2.8898 | 8.5 |
| 400 | 31.966 | 2.9970 | 19.4 |
| 401/313/215 | 32.376 | 2.7651 | 28.1 |
| 402/206 | 33.470 | 2.6772 | 2.2 |
| 224 | 33.967 | 2.6392 | 3.5 |

*Peak present but intensity too weak to permit accurate measurement.

TABLE 5

Calculation of d-values and Relative Intensities
MCM-40 Preparation of Example 16
Wavelength for this run: 1.54178 A

| INDEX | 2θ | d-VALUE | RELATIVE INTENSITY |
|---|---|---|---|
| 100 | 7.894 | 11.199 | 100.0 |
| 002 | 9.661 | 9.155 | 28.4 |
| 102 | 12.478 | 7.094 | 31.4 |
| 110 | 13.672 | 6.477 | 5.4 |
| 111/003 | 14.494 | 6.111 | 5.1 |
| 200 | 15.811 | 5.605 | 1.7 |
| 112 | 16.754 | 5.292 | 6.3 |
| 202 | 18.558 | 4.781 | 38.4 |
| 004 | 19.401 | 4.575 | 15.4 |
| 113 | 20.005 | 4.438 | 54.1 |
| 210/104 | 20.966 | 4.237 | 27.9 |
| 211/203 | 21.520 | 4.129 | 16.7 |
| 212 | 23.113 | 3.848 | 65.2 |
| 300/114 | 23.806 | 3.738 | 17.1 |
| 204 | 25.120 | 3.545 | 21.2 |
| 213/105 | 25.591 | 3.481 | 20.9 |
| 220 | 27.563 | 3.236 | 4.1 |
| 211/303/115 | — | — | —* |
| 310/214 | 28.707 | 3.110 | 25.9 |
| 311/205 | 29.170 | 3.061 | 11.9 |
| 222/006 | 29.298 | 3.048 | 8.5 |
| 312/106 | — | — | —* |
| 304 | 30.897 | 2.8940 | 4.8 |
| 400 | 31.930 | 2.8027 | 15.8 |
| 401/313/215 | 32.329 | 2.7690 | 16.3 |
| 402/206 | 33.432 | 2.6802 | 2.0 |
| 224 | 33.935 | 2.6416 | 2.4 |

*Peak present but intensity too weak to permit accurate measurement.

TABLE 6

Calculation of d-values and Relative Intensities
MCM-40 Preparation of Example 18
Wavelength for this run: 1.54178 A

| INDEX | 2θ | d-VALUE | RELATIVE INTENSITY |
|---|---|---|---|
| 100 | 7.897 | 11.195 | 100.0 |
| 002 | 9.673 | 9.143 | 15.7 |
| 102 | 12.487 | 7.088 | 11.6 |
| 110 | 13.681 | 6.472 | 4.8 |
| 111/003 | 14.496 | 6.110 | 2.0 |
| 200 | 15.789 | 5.613 | 1.3 |
| 112 | 16.781 | 5.283 | 1.6 |
| 202 | 18.554 | 4.782 | 13.0 |
| 004 | 19.425 | 4.570 | 7.4 |
| 113 | 20.012 | 4.437 | 20.1 |
| 210/104 | 20.975 | 4.232 | 10.7 |
| 211/203 | 21.527 | 4.128 | 6.4 |
| 212 | 23.126 | 3.846 | 21.3 |
| 300/114 | 23.816 | 3.736 | 7.1 |
| 204 | 25.145 | 3.542 | 6.2 |
| 213/105 | 25.612 | 3.478 | 6.3 |
| 220 | 27.560 | 3.236 | 1.6 |
| 211/303/115 | — | — | —* |
| 310/214 | 28.729 | 3.107 | 7.8 |
| 311/205 | 29.139 | 3.064 | 3.6 |
| 222/006 | 29.293 | 3.049 | 5.6 |
| 312/106 | 30.451 | 2.9354 | >1.0 |
| 304 | 30.905 | 2.8933 | 1.3 |
| 400 | 31.939 | 2.8020 | 8.1 |
| 401/313/215 | 32.363 | 2.7662 | 4.3 |
| 402/206 | 33.455 | 2.6784 | >1.0 |
| 224 | 33.956 | 2.6400 | 0.5 |
| 400 | 31.966 | 2.9970 | 19.4 |
| 401/313/215 | 32.376 | 2.7651 | 28.1 |
| 402/206 | 33.470 | 2.6772 | 2.2 |
| 224 | 33.967 | 2.6392 | 3.5 |

*Peak present but intensity too weak to permit accurate measurement.

Figure 1:
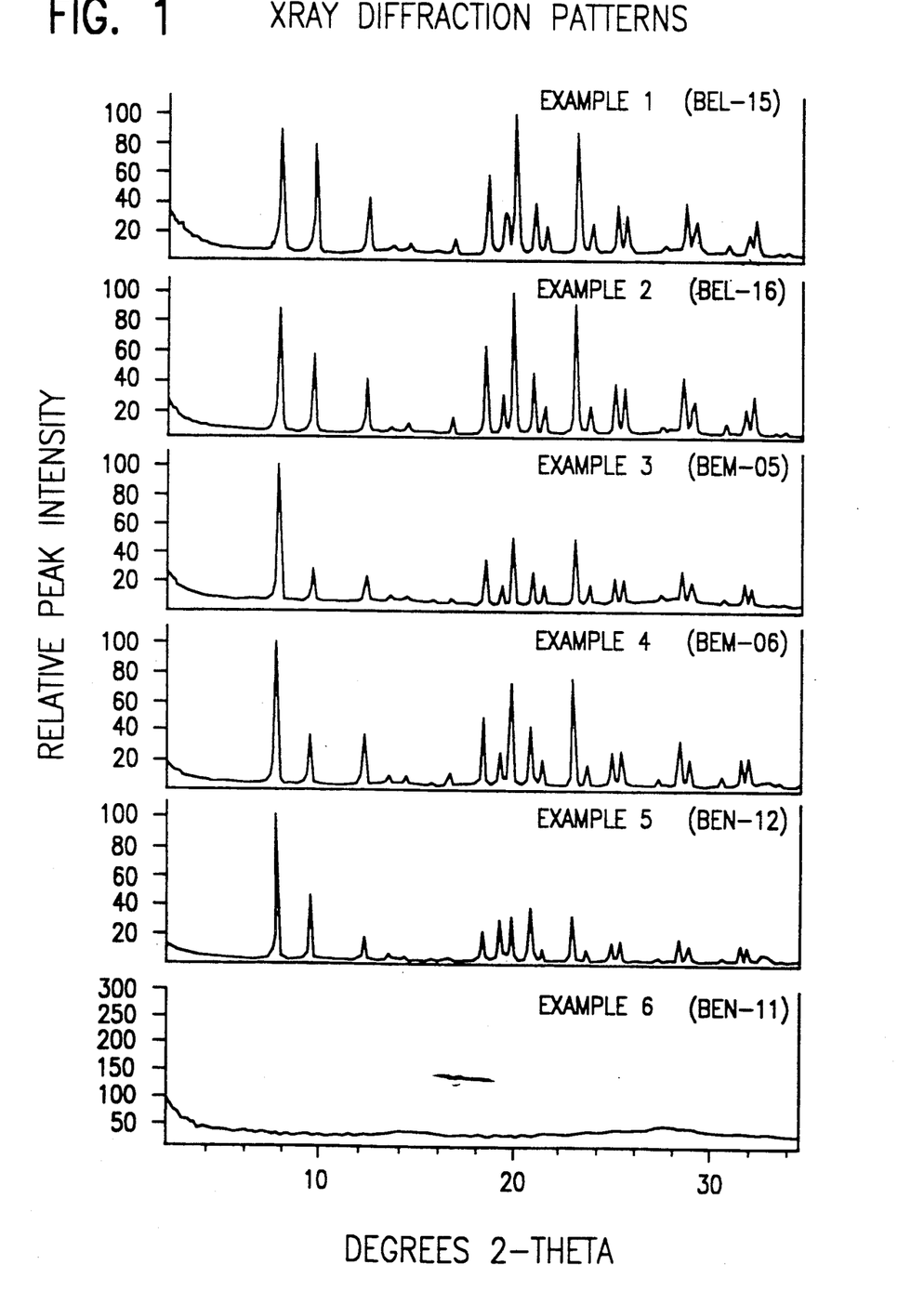
FIG. 1 shows the MCM-40 product X-ray diffraction patterns of the products of Examples 1 to 6.
Figure 2:
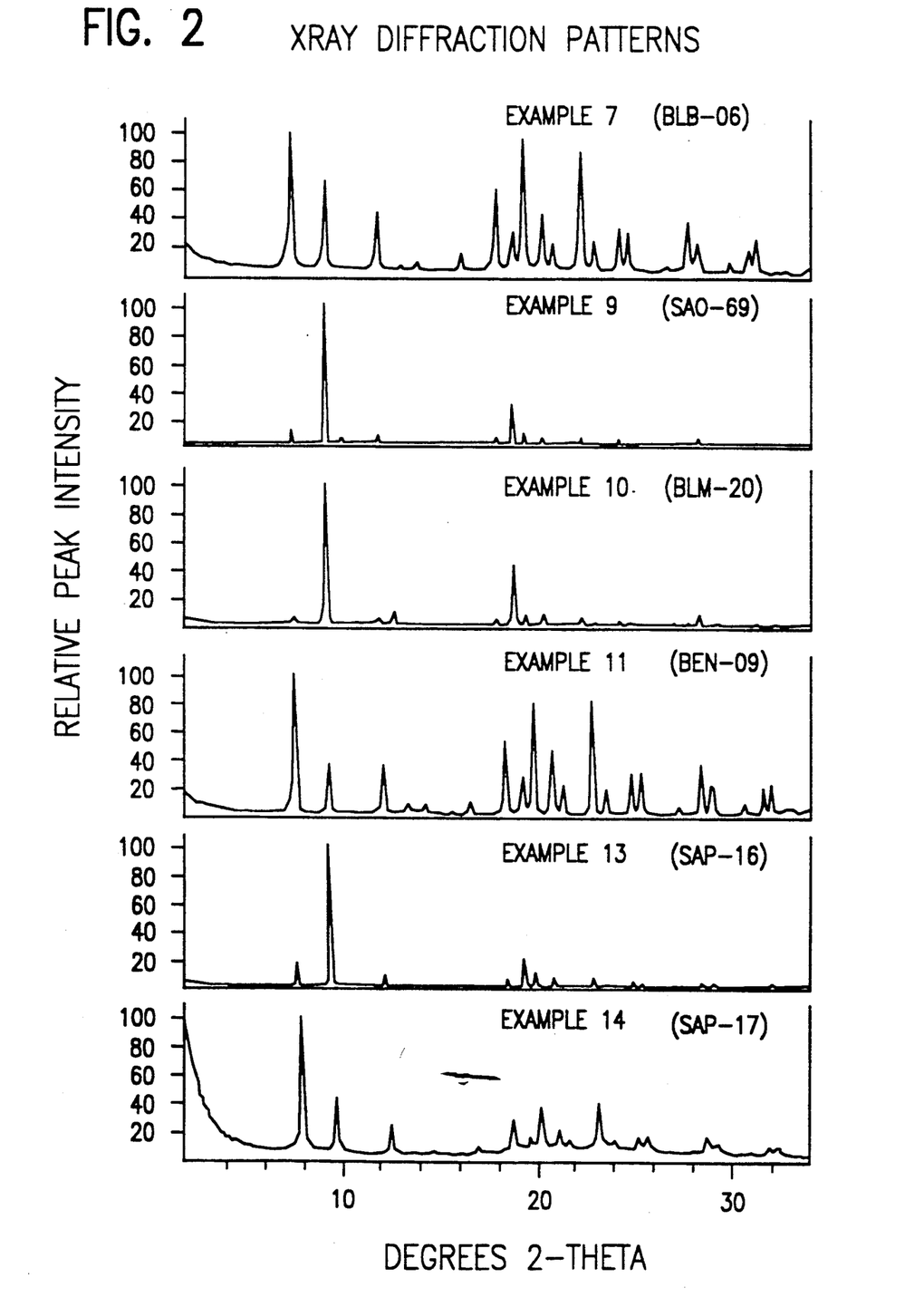
FIG. 2 shows the MCM-40 product X-ray diffraction patterns of the products of Examples 7, 9, 10, 11, 13 and 14.
Figure 3:
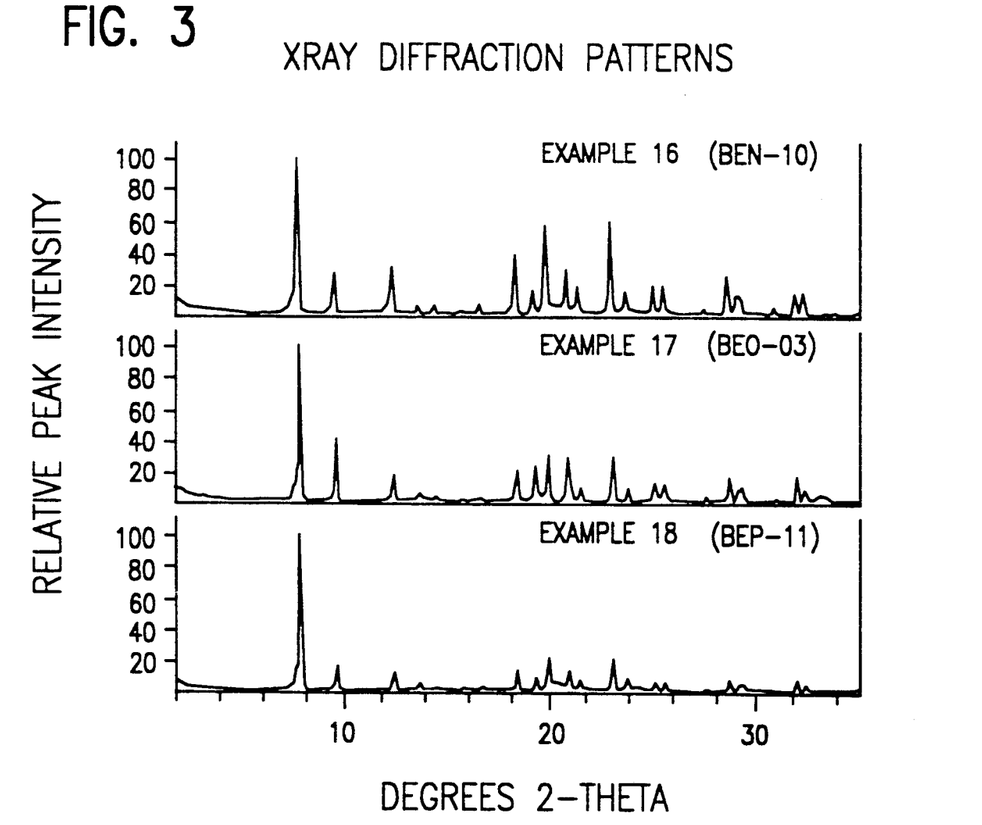
FIG. 3 shows the MCM-40 product X-ray diffraction patterns of the products of Examples 16, 17 and 18.

what is claimed is:

1. A method for synthesizing a composition comprising crystals having a framework topology giving an X-ray diffraction pattern with the following lines:

| Interplanar d-Spacings (A) | Relative Intensity* |
|---|---|
| 11.20 ± 0.09 | s-vs |
| 9.14 ± 0.08 | vw-vs |
| 5.28 ± 0.05 | vw-w |
| 4.78 ± 0.04 | vw-s |
| 4.43 ± 0.04 | vw-vs |
| 3.84 ± 0.03 | vw-vs |

*SCALE vw (very weak) = 0-20; w (weak) = 20-40; m (medium) = 40-60; s (strong) = 60-80; vs (very strong) = 80-100 where these particular d-values are chosen so as to uniquely define a unit cell, which method comprises i) preparing a mixture capable of forming said composition, said mixture comprising sources of +3 valence element X, +5 valence element Y and optionally one or more elements M of a valence selected from the group consisting of +2, +4, and +6, water and a directing agent (DA), and having a composition, in terms of mole ratios, within the following ranges:

| | |
|---|---|
| $M/X_2O_3$ | 0 to 1.2 |
| $Y_2O_5/X_2O_3$ | 1 to 1.6 |
| $H_2O/X_2O_3$ | 10 to 100 |
| $DA/X_2O_3$ | 0.2 to 1.2 | where DA is a diaminocyclohexane directing agent, and ii) maintaining the mixture under sufficient conditions until crystals of the desired crystalline composition are formed.

2. The method of claim 1 wherein X is selected from the group consisting of B, Al, Ga, and In, Y is selected from the group consisting of P, As, Sb, Bi, V, and Nb and M is selected from the group consisting of Be, Mg, Ca, Sr, Ba, Ti, Zr, Hf, V, Cr, Mo, W, Mn, Re, Fe, Ru, Os, Co, Rh, Ir, Ni, Pd, Pt, Cu, Zn, Cd, Hg, C, Si, Ge, Sn, Pb, S, Se, Te, and Po and DA is a 1,4-diaminocyclohexane.

3. The method of claim 2 wherein X is Al, Y is P, M is selected from the group consisting of Si and Co and DA is trans-1,4-diaminocyclohexane.

4. The method of claim 3 wherein said mixture has a composition, in terms of mole ratios, within the following ranges:

| | |
|---|---|
| $M/X_2O_3$ | 0 to 0.6 |
| $Y_2O_5/X_2O_3$ | 1 to 1.4 |
| $H_2O/X_2O_3$ | 20 to 80 |
| $DA/X_2O_3$ | 0.3 to 1 | and said conditions include temperatures of from 90° C. to 150° C. for a period of 0.5 to 100 hours; wherein said crystalline composition is recovered from step ii) by cooling the reaction medium to room temperature and water washing.

5. The method of claim 4 wherein said mixture has a composition, in terms of mole ratios, within the following ranges:

| | |
|---|---|
| $M/X_2O_3$ | 0 to 0.6 |
| $Y_2O_5/X_2O_3$ | 1 to 1.4 |
| $H_2O/X_2O_3$ | 20 to 80 |
| $DA/X_2O_3$ | 0.3 to 1 | wherein said source of Y is ortho-phosphoric acid and said conditions include temperatures from 130° C. to less than 150° C. for a period of time of from 5 to 25 hours.

6. The method of claim 5 wherein said source of X is selected from the group consisting of pseudo-boehmite and aluminum tetraalkoxide.

7. The method of claim 5 wherein M is cobalt and said source of cobalt is cobalt acetate.

8. The method of claim 5 wherein M is silicon and said source of silicon is colloidal silica.

9. The method of claim 1 comprising replacing cations of the crystalline composition, at least in part, by ion exchange with a cation or a mixture of cations selected from the group consisting of hydrogen and hydrogen precursors, rare earth metals, and metals from Groups IIA, IIIA, IVA, VIIA, VIIIA, IB, IIB, IIIB, and IVB of the Periodic Table of Elements.

10. The method of claim 9 wherein said replacing cation is hydrogen or a hydrogen precursor.

11. A composition of matter comprising crystals having a framework topology exhibiting the characteristic X-ray diffraction pattern with the following lines:

| Interplanar d-Spacings (A) | Relative Intensity* |
|---|---|
| 11.20 ± 0.09 | s-vs |
| 9.14 ± 0.08 | vw-vs |
| 5.28 ± 0.05 | vw-w |
| 4.78 ± 0.04 | vw-s |
| 4.43 ± 0.04 | vw-vs |
| 3.84 ± 0.03 | vw-vs |

*SCALE vw (very weak) = 0-20; w (weak) = 20-40; m (medium) = 40-60; s (strong) = 60-80; vs (very strong) = 80-100 where these particular d-values are chosen so as to uniquely define a unit cell.

12. The composition of matter of claim 11 having a composition, on an anhydrous basis, as follows:

$$DA_v{:}(XO_2)^-_{1-x}{:}(YO_2)^+_{1-y}{:}(MO_2)^{m-4}_{x+y}$$

wherein v is the number of moles of occluded 1,4-diaminocyclohexane directing agent (DA), X is +3 valence element, Y is +5 valence element, M is one or more elements of valence m (weighted average) having a valence selected from the group consisting of +2, +4 and +6, and x and y are numbers which satisfy the relationship:

$$z = y - x + (4 + m)(x + y)$$

wherein z is a number of from greater than −1 to less than +1.

13. The composition of matter of claim 12 having a composition, on an anhydrous basis, as follows:

$$(AlO_2)^-_{1-x}{:}(PO_2)^+_{1-y}{:}(MO_2)^{m-4}_{x+y}$$

and wherein said framework topology exhibits the characteristic X-ray diffraction pattern with the following lines:

| d = d Å | Intensity Range* |
|---|---|
| 11.20 ± 0.09 | s-vs |
| 9.14 ± 0.08 | vw-vs |
| 7.08 ± 0.06 | vw-m |
| 5.28 ± 0.05 | vw-w |
| 4.78 ± 0.04 | vw-s |
| 4.57 ± 0.04 | vw-m |
| 4.43 ± 0.04 | vw-vs |
| 4.23 ± 0.04 | vw-m |
| 4.12 ± 0.03 | vw-w |
| 3.84 ± 0.03 | vw-vs |
| 3.73 ± 0.03 | vw-w |
| 3.54 ± 0.03 | vw-m |
| 3.46 ± 0.03 | vw-w |
| 3.11 ± 0.03 | vw-m |
| 3.06 ± 0.03 | vw-w |
| 2.80 ± 0.02 | vw-w |
| 2.77 ± 0.02 | vw-w |

14. The composition of matter of claim 13 wherein said framework topology exhibits the characteristic X-ray diffraction pattern having the following lines:

| Interplanar d-Spacings (Å) | Relative Intensity |
|---|---|
| 11.180 | 85.9 |
| 9.120 | 49.9 |
| 7.073 | 35.8 |
| 6.470 | 3.5 |
| 6.101 | 7.4 |
| 5.604 | 1.3 |
| 5.282 | 13.4 |
| 4.776 | 63.0 |
| 4.566 | 32.4 |
| 4.435 | 100.0 |
| 4.232 | 46.3 |
| 4.125 | 20.7 |
| 3.842 | 96.6 |
| 3.732 | 19.6 |
| 3.539 | 35.0 |
| 3.475 | 32.3 |

-continued

| Interplanar d-Spacings (Å) | Relative Intensity |
|---|---|
| 3.236 | 4.2 |
| 3.184 | 3.1 |
| 3.105 | 40.0 |
| 3.062 | 13.2 |
| 3.046 | 19.1 |
| 2.8898 | 8.5 |
| 2.7997 | 19.4 |
| 2.7651 | 28.1 |
| 2.6772 | 2.2 |
| 2.6392 | 3.5 |

15. The composition of matter of claim 12 wherein said X is Al, Y is P, and M is Co.

16. The composition of matter of claim 12 wherein said X is Al, Y is P, and M is Si.

17. The composition of matter of claim 12 wherein $x+y=0$.

18. The composition of matter of claim 13 wherein $x+y=0$.

19. A process for effecting catalytic conversion of an organic compound-containing feedstock which comprises contacting said feedstock under catalytic conversion conditions with a catalyst comprising a composition of matter comprising crystals having a framework topology exhibiting the characteristic X-ray diffraction pattern with the following lines:

| Interplanar d-Spacings (Å) | Relative Intensity* |
|---|---|
| 11.20 ± 0.09 | s-vs |
| 9.14 ± 0.08 | vw-vs |
| 5.28 ± 0.05 | vw-w |
| 4.78 ± 0.04 | vw-s |
| 4.43 ± 0.04 | vw-vs |
| 3.84 ± 0.03 | vw-vs |

*SCALE: vw (very weak) = 0-20; w (weak) = 20-40; m (medium) = 40-60; s (strong) = 60-80; vs (very strong) = 80-100 where these particular d-values are chosen so as to uniquely define a unit cell.

* * * * *